(12) United States Patent
O'Connor et al.

(10) Patent No.: US 11,060,246 B2
(45) Date of Patent: Jul. 13, 2021

(54) RECYCLED ASPHALT BAGHOUSE APPARATUS

(71) Applicant: GREEN ASPHALT CO. LLC, Long Island City, NY (US)

(72) Inventors: David A. O'Connor, Elkton, MD (US); Daniel H. Palmer, Sr., Wilmington, DE (US); Nima R. Sefidmazgi, Long Island, NY (US)

( * ) Notice: Subject to any disclaimer, the term of this patent is extended or adjusted under 35 U.S.C. 154(b) by 432 days.

(21) Appl. No.: 16/059,442

(22) Filed: Aug. 9, 2018

(65) Prior Publication Data

US 2019/0048535 A1    Feb. 14, 2019

Related U.S. Application Data

(60) Provisional application No. 62/543,283, filed on Aug. 9, 2017.

(51) Int. Cl.
*E01C 19/10*  (2006.01)
*F26B 25/00*  (2006.01)
(Continued)

(52) U.S. Cl.
CPC ...... *E01C 19/1004* (2013.01); *E01C 19/1036* (2013.01); *F26B 11/028* (2013.01);
(Continued)

(58) Field of Classification Search
CPC ........................ B01D 2258/0291; B01D 45/08; B01D 45/10; B01D 46/0031; B01D 46/0056; B01D 50/002; E01C 19/05; E01C 19/1004; E01C 19/1036; E01C 23/14; F26B 11/028; F26B 23/02; F26B 25/007
See application file for complete search history.

(56) References Cited

U.S. PATENT DOCUMENTS 3,958,959 A    5/1976  Cohen et al.
3,969,482 A *  7/1976  Teller .................... B01D 53/60
                                                    423/235

(Continued)

OTHER PUBLICATIONS

International Search Report and Written Opinion, dated Mar. 6, 2019, from corresponding International Patent App. No. PCT/US2018/045937.

*Primary Examiner* — Tony G Soohoo
(74) *Attorney, Agent, or Firm* — Greenberg Traurig, LLP

(57) ABSTRACT

A baghouse apparatus for removing particulates from a 100% recycled asphalt pavement dryer exhaust air stream includes a drop out zone section having a water spray operable to initially drench an incoming air exhaust stream with water droplets while increasing air stream velocity, then slow the air stream velocity to cause drop out of particulates >1000 μm from the slowed waste air stream, and collect the particulates dropped out of the waste air exhaust stream. The apparatus also includes a cyclonic scrubber section for further cooling the waste air exhaust stream while subjected the stream to a further water spray to condense aerosol vapor into droplets, a prefilter filtration section operable to collect and remove condensed aerosol droplets from the waste air stream; and a coalescing filtration section operable to remove 99% of remaining particulates from the waste air stream before discharge of the air stream to atmosphere.

17 Claims, 3 Drawing Sheets

(51) Int. Cl.
  *B01D 45/10* (2006.01)
  *B01D 45/08* (2006.01)
  *B01D 46/00* (2006.01)
  *B01D 50/00* (2006.01)
  *F26B 11/02* (2006.01)
  *E01C 19/05* (2006.01)
  *F26B 23/02* (2006.01)
  *E01C 23/14* (2006.01)

(52) U.S. Cl.
  CPC ............ *F26B 25/007* (2013.01); *B01D 45/08* (2013.01); *B01D 45/10* (2013.01); *B01D 46/0031* (2013.01); *B01D 46/0056* (2013.01); *B01D 50/002* (2013.01); *B01D 2258/0283* (2013.01); *B01D 2258/0291* (2013.01); *E01C 19/05* (2013.01); *E01C 23/14* (2013.01); *F26B 23/02* (2013.01)

(56) References Cited

U.S. PATENT DOCUMENTS

| | | | | |
|---|---|---|---|---|
| 4,023,938 A * | 5/1977 | Guth | ............. | B01D 1/007 95/201 |
| 4,049,399 A * | 9/1977 | Teller | ............. | B01D 53/501 95/36 |
| 5,083,870 A * | 1/1992 | Sindelar | ............. | E01C 19/10 34/137 |
| 5,252,124 A * | 10/1993 | Brashears | ............. | B01D 46/02 106/281.1 |
| 5,904,751 A * | 5/1999 | Van Niekerk | ............. | B01D 46/30 55/385.1 |
| 5,935,300 A * | 8/1999 | Niekerk | ............. | B01D 45/08 55/385.1 |
| 6,016,610 A * | 1/2000 | Sears | ............. | D06F 58/22 34/604 |
| 6,068,674 A * | 5/2000 | Dullien | ............. | B01D 45/02 55/308 |
| 6,149,697 A * | 11/2000 | Dullien | ............. | B01D 45/02 55/308 |
| 6,478,461 B1 * | 11/2002 | Frank | ............. | B01D 45/08 34/135 |
| 6,832,850 B1 * | 12/2004 | Frank | ............. | B01D 45/08 366/25 |
| 7,160,358 B2 * | 1/2007 | Spink | ............. | B01D 46/003 34/467 |
| 9,683,740 B2 * | 6/2017 | Rodgers | ............. | B01D 45/16 |
| 9,688,935 B1 | 6/2017 | Wiley et al. | | |
| 2003/0004079 A1 * | 1/2003 | Aigner | ............. | C11D 7/266 510/240 |
| 2008/0307964 A1 * | 12/2008 | Spink | ............. | F23J 15/006 95/60 |
| 2012/0263007 A1 * | 10/2012 | Swanson | ............. | E01C 19/1072 366/7 |
| 2019/0048535 A1 * | 2/2019 | O'Connor | ............. | F26B 11/028 |

\* cited by examiner

RECYCLED ASPHALT BAGHOUSE APPARATUS

CROSS REFERENCE TO RELATED APPLICATIONS

This application claims the benefit of priority of U.S. Provisional Patent Application Ser. No. 62/543,283 filed Aug. 9, 2017, having the same title, the content of which is hereby incorporated by reference in its entirety.

BACKGROUND OF THE DISCLOSURE

This disclosure relates generally asphalt production utilizing 100% recycled asphalt pavement (RAP) materials and more particularly to a handling of emissions from a RAP mixer/dryer apparatus.

Aggregates, sand and composite materials processed within current asphalt production apparatuses and systems are very corrosive and abrasive to the mixer/dryer drum portion of the apparatus, especially where recycled materials are utilized. Recycled material is more abrasive and corrosive due to the remnant chemical additives and abrasive constituents typically present with such materials. In the recycled asphalt production industry, the process generates a waste stream which is typically treated in a baghouse to remove particulates and render the effluent gases environmentally acceptable. However, such baghouses typically become quickly clogged with particulate matter requiring significant system down time to replenish filter media. Therefore there is a need for an apparatus that minimizes both the effects of particle buildup on the interior components of the baghouse and minimizes the impact of release of environmental pollutants to the atmosphere.

SUMMARY OF THE DISCLOSURE

A RAP baghouse apparatus in accordance with the present disclosure meets these needs. A baghouse apparatus for removing particulates from a 100% recycled asphalt pavement dryer exhaust air stream in accordance with the present disclosure includes a drop out zone section having a water spray operable to drench an incoming air exhaust stream with water to thoroughly wet particulates in the air exhaust stream forming droplets while increasing air stream velocity, slow the air stream velocity to cause drop out of wetted particulates from the slowed waste air stream, and collect particulates dropped out of the waste air exhaust stream. The apparatus also includes a cyclonic scrubber section for further cooling the waste air exhaust stream while subjected the stream to a water spray to condense aerosol vapor into droplets, an indexing prefilter filtration section operable to collect and remove condensed aerosol droplets from the waste air stream, and a coalescing filtration section operable to remove 99% of remaining particulates from the waste air stream. The cleansed airstream is then drawn through a fan module and released to the atmosphere.

The drop out zone section has a plurality of airflow deflection plates positioned within an upper portion of the section to deflect air flow causing particulates to drop out of the air stream and fall to a bottom of the drop out zone section. The drop out zone further preferably has a removable drawer or bin at a bottom of the zone section for receiving and collecting particulates dropping out of the waste air stream. This drawer preferably rides on spaced parallel guide rails on a floor of the bottom of the drop out zone section.

The water spray is applied to the waste air exhaust stream before entering a drop out zone section housing. The drop out zone section housing has a first converging portion for increasing air stream velocity, then a diverging portion for slowing the air stream velocity, and finally a bottom collecting portion receiving particulates dropped out of the slowing air stream. The converging portion has one or more stationary plates directed at an angle to the air stream for deflecting and separating particulates from the air stream. The drop out zone section removes 95% or more of particulates >1000 μm in diameter. The air stream leaves the drop out zone section through an opening adjacent the bottom collecting portion of the drop out zone section into the cyclonic scrubber section.

A baghouse apparatus for removing particulates from a 100% recycled asphalt pavement dryer exhaust air stream may also be viewed as including a drop out zone section having a water spray operable to drench an incoming air exhaust stream with water droplets while increasing air stream velocity, slow the air stream velocity to cause drop out of particulates >1000 μm from the slowed waste air stream, and collect the particulates dropped out of the waste air exhaust stream, a cyclonic scrubber section for further cooling the waste air exhaust stream while subjected the stream to a water spray to condense aerosol vapor into droplets, a bag filtration section operable to collect and remove condensed aerosol droplets from the waste air stream, and a coalescing filtration section operable to remove 99% of remaining particulates from the waste air stream.

The drop out zone section preferably has a plurality of airflow deflection plates positioned within an upper portion of the section to deflect air flow causing particulates to drop out of the air stream and fall to a bottom of the drop out zone section. The drop out zone further has a removable drawer or bin at the bottom of the drop out zone section for receiving and collecting particulates dropping out of the waste air stream. The removable drawer preferably rides on spaced parallel guide rails on a floor of the bottom of the drop out zone section. The water spray is applied to the waste air exhaust stream before entering a drop out zone section housing. The drop out zone section housing preferably has a converging portion for increasing air stream velocity, a diverging portion for slowing the air stream velocity, and a bottom collecting portion receiving particulates dropped out of the slowing air stream. The converging portion has one or more stationary plates directed at an angle to the air stream for deflecting and separating particulates from the air stream. The air stream leaves the drop out zone section through an opening adjacent the bottom collecting portion of the drop out zone section into the cyclonic scrubber section.

These and other features of embodiments in accordance with the present disclosure will become more apparent upon a reading and understanding of the following detailed description of various embodiments when taken in conjunction with the drawings.

DETAILED DESCRIPTION

Figure 1:
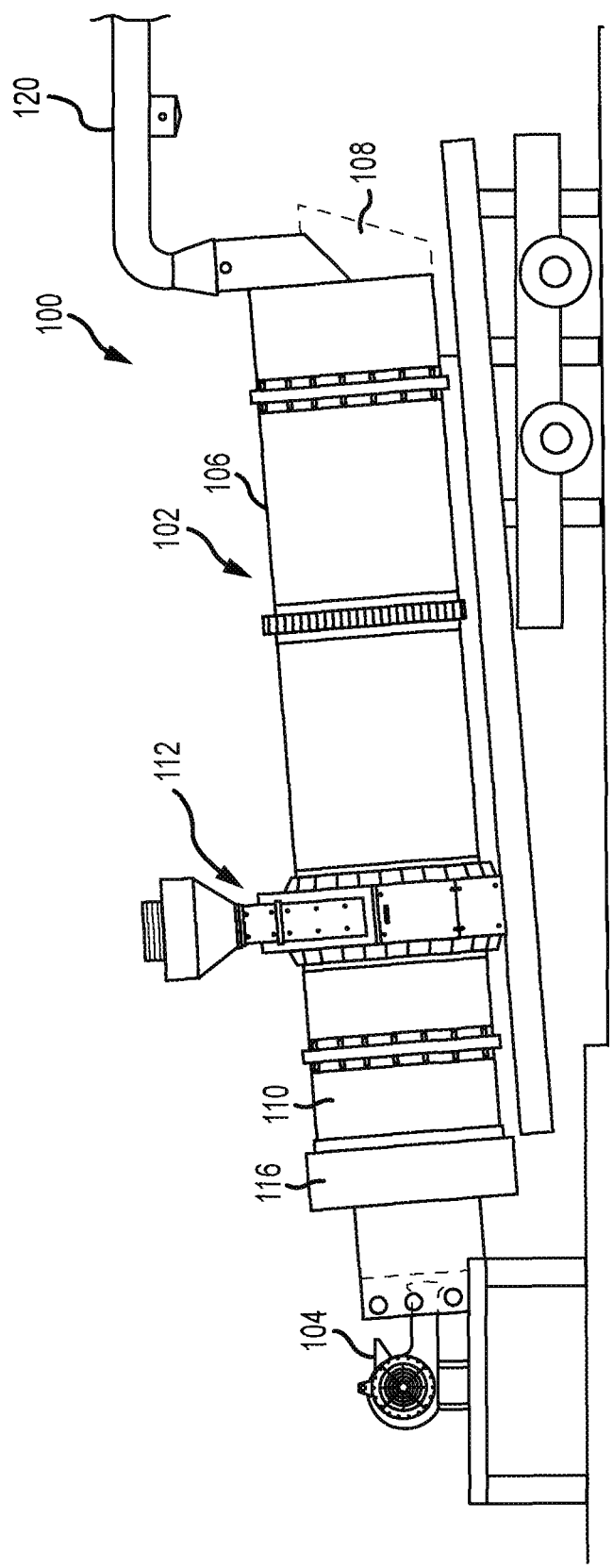
FIG. 1 is a schematic side view of an exemplary rotary dryer of a 100% recycled asphalt pavement production apparatus in accordance with the present disclosure.
Figure 2:
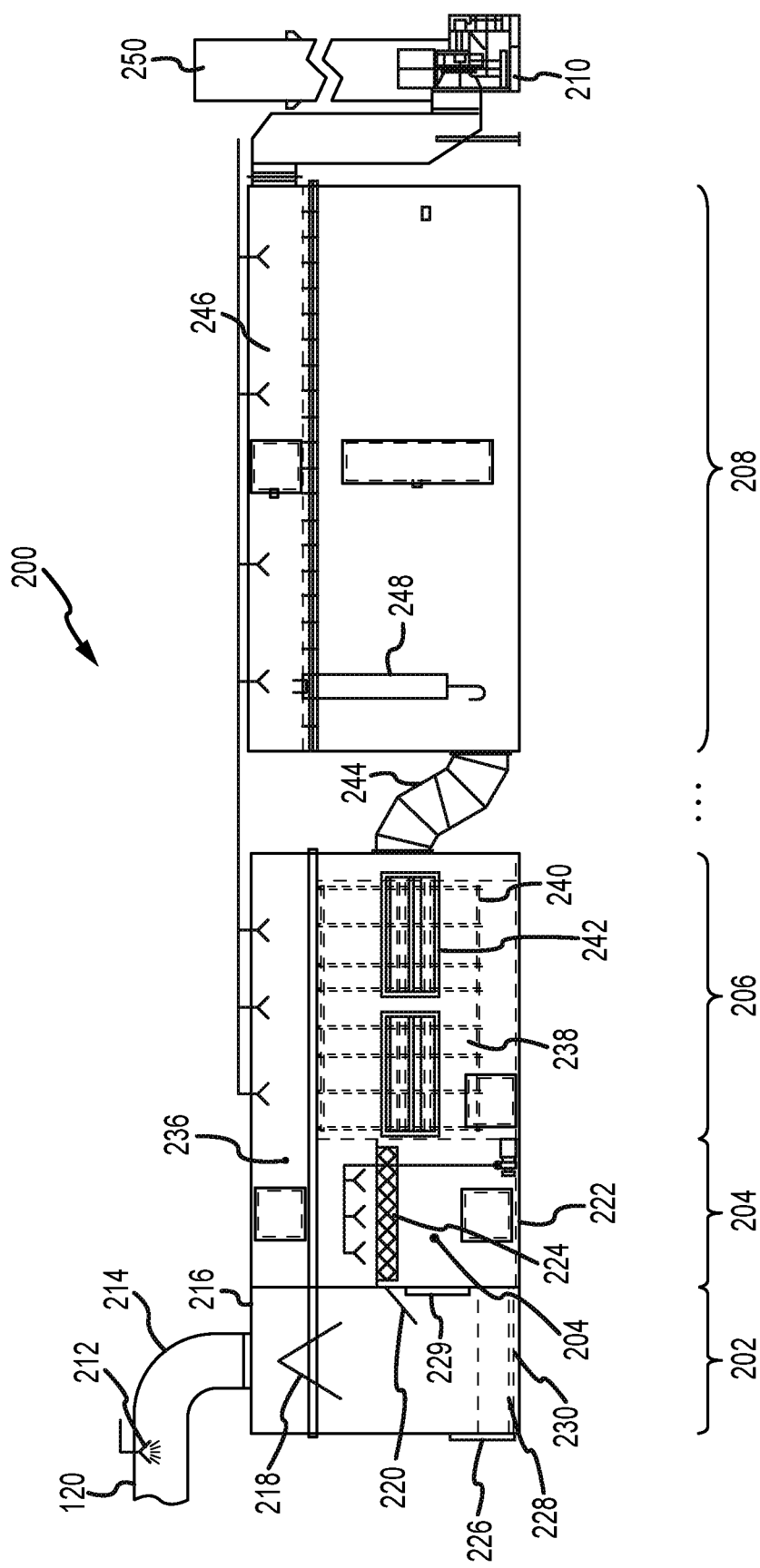
FIG. 2 is a schematic side cross sectional view of a baghouse connected to a 100% recycled asphalt pavement production dryer apparatus shown in FIG. 1 in accordance with the present disclosure.

An exemplary Recycled asphalt processing apparatus 100 in accordance with the present disclosure is shown together in FIGS. 1 and 2. FIG. 1 is a side view of an exemplary dryer portion of a hot-mix asphalt apparatus 100 for use with 100% reclaimed asphalt pavement components in accordance with the present disclosure. FIG. 2 is a schematic side cross sectional view of the exhaust air handling apparatus 200 of the processing apparatus 100 in accordance with the present disclosure. It should be appreciated that other types of asphalt mixing systems and dryer apparatuses may be utilized with the exhaust handling apparatus 200 which incorporate features in accordance with the present disclosure.

This exemplary hot-mix asphalt manufacturing apparatus 100 includes a rotary dryer 102 adapted to receive preferably recycled sand and crushed stone pavement ingredients of previously used hot-mix asphalt pavement and to perform a mixing and/or drying process on these ground up ingredients. Preferably, the rotary dryer 102 has a heat source, such as a burner 104, feeding heated air into a rotatable drum 106 axially mounted in tandem with the burner 104 so that the drum 106 rotates about an inclined axis with respect to a horizontal ground surface upon which the dryer 102 is supported. The rotatable drum 106 has a first end 108. Large grain recycled or virgin aggregate material is introduced into the dryer drum 106 at or near the first end 108 of the rotatable drum 106.

Fine grain aggregate, virgin sand or more preferably recycled asphalt pavement sand, is introduced through a stationary Recyclable Asphalt Pavement (RAP) collar 112, preferably located at about midway along the length of the rotatable drum 106. An outlet conveyor (not shown) for the hot-mix asphalt manufactured by the rotary dryer 102 can be located at or near a discharge 116 adjacent the second or opposite end 110 of the dryer drum 106.

The rotary dryer 102 preferably may include mixing flights that are radially spaced apart, offset at an angle, and extending radially inward from the inner circumferential wall of the rotatable drum 106. These flights turn with the drum 106, mix and move the aggregate materials along the interior of the dryer drum 106, from the first end 108 and from the RAP collar 112, toward the second end 110 as the drum 106 is rotated. At the same time, hot air and combustion gases from the burner 104 flow in a counter flow fashion from the second end 110 of the rotary dryer 102 toward the first end 108 to heat and dry the ingredients as they are mixed and tumbled within the drum 106. It is to be understood that the dryer arrangement may, in other embodiments, be reversed, with the flow of gas and hot air moving in the same direction as the flow of mixed ingredients. In such a case, the inclined nature of the dryer drum 106 would preferably be reversed such that gravity aids in the flow of the mixed ingredients.

Supplemental ingredients (conditioning oils or additives) can be introduced into the rotary dryer 102 at various appropriate locations along the length of the drum 106 so that these supplemental ingredients are mixed with the fine and course recycled or new aggregates at proper times during drying and in a uniform fashion. The supplemental ingredients can, for example, include asphalt cement, rejuvenators, plasticizers, and/or combinations thereof. Downstream (with respect to ingredient flow), the hot-mix asphalt manufactured by the rotary dryer 102 is allowed to drop through the outlet 116 onto a hot-mix conveyor (not shown) for delivery to an appropriate storage facility (also not shown).

The recycled asphalt product process generates a waste air stream which must be cleansed of particulates. Therefore a filtration baghouse 200 is attached via suitable ductwork 120 to draw the exhaust from the rotary dryer 102. The baghouse 200 in accordance with the present disclosure is shown in FIG. 2. The baghouse 200 includes four discrete sections: a drop out zone section 202, a cyclonic scrubber section 204, a indexing filter section 206, and a submicron filtration section 208 connected together in series in which each is designed to remove progressively smaller particulates from the waste air exhaust stream from the dryer 102.

The drop out zone section 202 removes large diameter mass particulate material from the exhaust air pulled from the dryer 102 via an end stack exhaust fan module 210. By utilizing an end exhaust fan module 210, the baghouse apparatus avoids discharging any exhaust air prior to it having been completely processed through each section of the apparatus 200.

The exhaust air/gas coming into the drop out zone section 202 may be heavily laden with road debris, e.g., hot, sticky organic and inorganic particles from any and all materials that were present in the roadway or street which were picked up and passed through the recycled asphalt raw grinding process and passed through the dryer 102. These particles typically can include leaves, plastic bottles and parts, paper waste, etc., and can vary greatly in size and moisture content. The drop out zone section 202 is configured to trap and remove solid particulates ranging in size from fractured aggregate range in size 1 to 20 mesh, i.e. about 1 inch diameter down to about 0.04 inch diameter. This drop out zone section 202 is critical to prolong the functional lifetime of the remaining filtration sections 204, 206 and 208 of the baghouse between maintenance and filtration media replacement operations.

The exhaust from the dryer 102 may also include asphalt aerosol mist, primarily submicron size (0.01 µm to 1.0 µm) and water moisture ranging from saturated to about 10% RH. Each of the subsequent sections 204, 206 and 208 removes progressively smaller particulates and aerosols until the air being drawn through the fan section 210 is substantially free of any particulate matter for atmospheric exhaust.

The exhaust air passing from the dryer 102 through ductwork 120 first encounters a water spray head 212 at the beginning of the drop out zone 202 and then follows a right angle bend 214 into the drop out zone housing 216. The spray head 212 introduces water preferably in droplet sizes approximately equal to the majority of particles which are being removed. The spray head produces droplets in various sizes representing a bell curve with the top of the curve representing the design size of 30-50 µm. A secondary benefit of passing the exhaust through the spraying is to wet larger (50-1000 µm) particles for effective removal in the drop out zone section 202. The smaller droplets represented nearer the bottom of the bell curve are much better suited for evaporative cooling of the exhaust air temperature. This adiabatic cooling, using water introduced by spray, is necessary to condense vapor phase asphalt into the aerosol mist for subsequent removal by the filtration media in section 206 described below.

Figure 3:
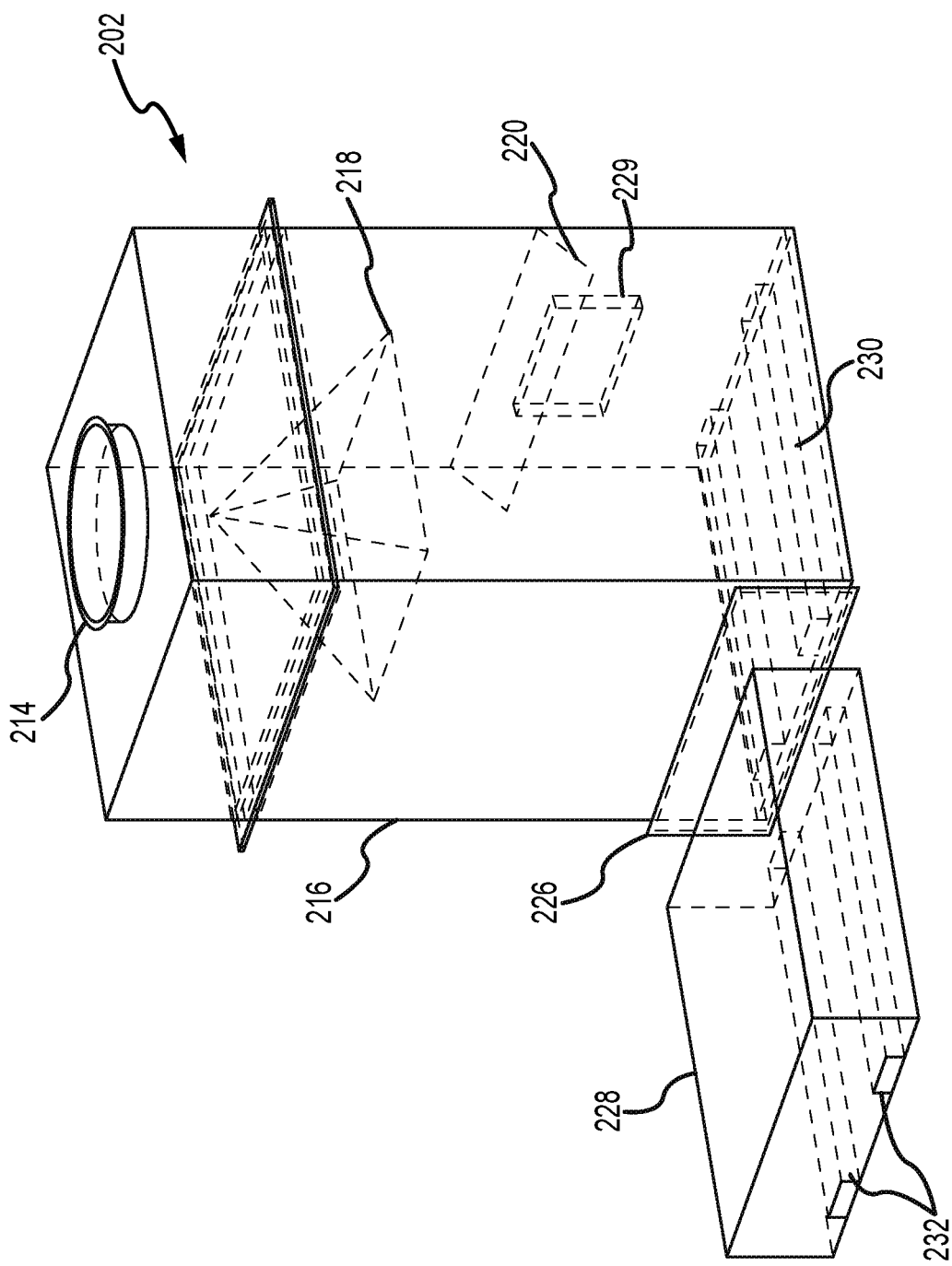
FIG. 3 is an enlarged perspective view of the drop out zone of the apparatus shown in FIG. 2.

An enlarged perspective view of the drop out zone section 202 is shown in FIG. 3. The wet air and wetted particulates entering into the compartment/housing 216 encounter baffle plates 218 and 220 which change the direction of air flow through the section 202. Baffle plates 218 preferably form a pyramid structure centered directly below the exhaust air entrance into housing 216, which causes the incoming air exhaust flow rate to initially increase via constricting the flow through a smaller cross sectional area as the air exhaust stream passes downward through the upper portion of the drop zone section 202. Some of the particulates, particularly the larger and heavier particulates, >1000 μm tend to deposit on these baffle plates 218 and 220 and then drop down to the bottom of the drop out zone section 202 for eventual collection. These large particles are also removed as the velocity of the air flow through the bottom portion of the drop out zone section 202 is slowed to about 500 FPM. Removal of these large particulates is critical because this size particle would otherwise blind the downstream filtration sections 206 and 208 quickly and accumulate in the sump 222 below the cyclonic scrubber 224 in section 204.

This removal of large particulates is primarily achieved by changing the air flow velocity and direction in the drop zone section 202. First the velocity is increased as just described, to about 3500 FPM into the baffles which forces the particles to impact into the baffle plates 218 and 220, slowing their momentum. The slower momentum encourages the particles to separate from the air stream This increased velocity is achieved by decreasing the cross sectional area between baffle 218 and the walls of the drop zone section 202. The air velocity is then slowed below the baffle plates 218 to between 400 to 500 FPM so that the 0.1000 μm particles can no longer be supported by the flowing air. These particles drop from the air or from the slanted baffles 218 and 220 into a holding tray 226. This drop zone section 202 is designed to remove greater than about 95% of all particulates greater than 1000 μm. This greatly reduces the amount of particulate entering the cyclonic scrubber section 204 and the downstream filtration bed sections 206 and 208.

The removed particulates accumulate in a collection bin 228 within the holding tray 226. This collection bin 228 is essentially a rectangular drawer that slides or rolls along the bottom of the holding tray 226, and can be rolled or slid out via forklift truck to remove its contents and replace with a cleaned collection bin 228. The collection bin 228 preferably rides on guide rails 230 along the bottom of the holding tray 226. The holding tray 226 may also include complementary guide features or ribs 232 to guide the bin 228 during removal and insertion.

The exhaust air entering and passing through the drop out zone section 202 is cooled adiabatically to about 150° F. as it flows around the baffles 218 and 220, and exits through an opening 229 above the collection bin 228 into the cyclonic scrubber section 204.

In the cyclonic scrubber section 204 the exhaust air, now cleansed of large particles and particulate, and at or below approximately 150 F, is pulled upward through a stationary set of cyclonic scrubber vanes 232, through a water spray 234 to an upper plenum 236, and then into an indexing prefilter section 206, where particulates sized greater than about 10 μm are removed. The cyclonic scrubber vanes 232 cause the velocity of the air passing through them to increase and spin, with the air intimately mixing with water spray 234, which further cools the air and condenses asphalt aerosol mist into droplets entrained in the air.

The exhaust air entering the indexing prefilter section 206 passes through a cloth fabric media 238 disposed on rotating cylindrical cages 240. The cloth filter media 238 is dispensed from and taken up on rolls 242. The particulates collect on the surface of the cloth filter fabric 238 as the waste air passes through the fabric media 238.

The exhaust air then passes through a ductwork 244 into submicron fiber coalescing filtration section 208 where >99% of remaining fine particulates are removed prior to discharging the exhaust air to atmosphere through an exhaust fan module 210. The coalescing filtration section 208 preferably consists of a three dimensional array of cylindrical fiber bed mist collectors 248. The fibers are specifically chosen to remove 99% of submicron particulates while providing a low pressure drop of an operating range of 1-12" W.C. The air flows from outside the cylindrical tubes of the filter media of collectors 248 toward the center and then up and out to an upper plenum area 246. The particulates then may be blown off the collectors 248 and drained from the bottom of the section 208, or alternatively the collectors 248 may simply be removed and replaced. The treated air exits the filter section 208 in the upper plenum area 246 and is pulled by the exhaust fan module 210 and exhausted to atmosphere through a stack 250.

The particulates in the waste air stream from the dryer 102 are extremely abrasive and caustic to components in the baghouse system, particularly those in the drop out zone section 202, cyclonic scrubber section 204 and filter section 206, requiring careful selection of materials for the deflection plates, collection bin or drawer 226, filter media cages, etc. In particular, the collection bin 226 is preferably made of 304 or 316 stainless steel for resistance to corrosion.

There are many alternatives and modifications that will be apparent to those skilled in the art. For example, the structure of the drop out zone section 202 may be other than as specifically described above. The pyramid configuration of baffle plates 218 may be replaced with a conical plate structure, for example. A larger or different array of baffles 218 and 220 than as illustrated may be utilized to remove the large diameter/mass wetted particulates. For example, rather than simple slanted flat plates, they may be sets of parallel corrugated or rounded plates so as to act as cyclonic separators in addition to simply directional changing baffles. The collection bin 228 may be other than a box drawer. For example, a continuous belt may be included in the collection bin 228 to pull the contents out of the Drop out zone section 202 without removing the bin 228 as frequently is in a box drawer embodiment.

All such changes, alternatives and equivalents in accordance with the features and benefits described herein, are within the scope of the present disclosure. Such changes and alternatives may be introduced without departing from the spirit and broad scope of the invention as defined by the claims below and their equivalents.

What is claimed is:

1. A baghouse apparatus for removing particulates from a 100% recycled asphalt pavement dryer exhaust air stream, the apparatus comprising:

a drop out zone section having a water spray operable to first drench an incoming exhaust air stream with water droplets and configured to increase exhaust air stream velocity, wherein the drop out zone section is further configured to slow the exhaust air stream velocity to cause drop out of particulates from the slowed exhaust air stream, and collect particulates dropped out of the waste air exhaust stream;

a cyclonic scrubber section for further cooling the waste air exhaust stream configured to subject the exhaust air stream to a second water spray to condense aerosol vapor into droplets;

a prefilter filtration section operable to collect and remove condensed aerosol droplets from the exhaust air stream, wherein the prefilter filtration section has one or more rotating cylindrical cages and a cloth fabric media disposed on the one or more rotating cylindrical cages configured to collect particulates on the surface of the cloth filter media and wherein the cloth fabric media is dispensed from and taken up on rolls; and a coalescing filtration section operable to remove 99% of remaining particulates from the exhaust air stream, wherein the coalescing filtration section includes a three-dimensional array of cylindrical fiber bed mist collectors.

2. The baghouse apparatus according to claim 1 wherein the drop out zone section has a plurality of airflow deflection plates positioned within an upper portion of the drop out zone section to deflect air flow causing particulates to drop out of the exhaust air stream and fall to a bottom of the drop out zone section.

3. The baghouse apparatus according to claim 1 wherein the drop out zone section further comprises a removable drawer at a bottom of the zone for receiving and collecting particulates dropping out of the waste air stream.

4. The baghouse apparatus according to claim 3 wherein the removable drawer rides on spaced parallel guide rails on a floor of the bottom of the drop out zone section.

5. The baghouse apparatus according to claim 3 wherein the water spray is applied to the exhaust air stream before entering a drop out zone section housing.

6. The baghouse apparatus according to claim 5 wherein the drop out zone section housing has a converging portion for increasing air stream velocity, a diverging portion for slowing the air stream velocity, and a bottom collecting portion receiving particulates dropped out of the slowing air stream.

7. The baghouse apparatus according to claim 6 wherein the converging portion has one or more stationary plates directed at an angle to the air stream for deflecting and separating particulates from the air stream.

8. The baghouse apparatus according to claim 7 wherein the air stream leaves the drop out zone section through an opening adjacent a bottom collecting portion of the drop out zone section into the cyclonic scrubber section.

9. The baghouse apparatus according to claim 1 wherein the drop out zone section is configured to remove 95% or more of particulates >1000 μm in diameter.

10. A baghouse apparatus for removing particulates from a 100% recycled asphalt pavement dryer exhaust air stream, the apparatus comprising:

a drop out zone section having a water spray operable to initially drench an incoming air exhaust stream with water droplets and configured to increase air stream velocity, wherein the drop out zone section is further configured to slow the air stream velocity to cause drop out of particulates >1000 μm from the slowed waste air stream, and collect the particulates dropped out of the waste air exhaust stream in a container located at the bottom of the drop out zone section;

a cyclonic scrubber section for further cooling the waste air exhaust stream configured to subject the waste air stream to another water spray to condense aerosol vapor into droplets;

an indexing prefilter section operable to collect and remove condensed aerosol droplets from the waste air stream, wherein the indexing prefilter section has one or more rotating cylindrical cages and a cloth fabric media disposed on the one or more rotating cylindrical cages configured to collect particulates on the surface of the cloth filter media and wherein the cloth fabric media is dispensed from and taken up on rolls; and a coalescing filtration section operable to remove 99% of remaining particulates from the waste air stream.

11. The baghouse apparatus according to claim 10 wherein the drop out zone section has a plurality of airflow deflection plates positioned within an upper portion of the drop out zone section to deflect air flow causing particulates to drop out of the air stream and fall to the bottom of the drop out zone section.

12. The baghouse apparatus according to claim 11 wherein the removable container in the bottom of the drop out zone section further comprises a removable drawer at the bottom of the drop out zone section for receiving and collecting particulates dropping out of the waste air stream.

13. The baghouse apparatus according to claim 12 wherein the removable drawer rides on spaced parallel guide rails on a floor of the bottom of the drop out zone section.

14. The baghouse apparatus according to claim 12 wherein the water spray is applied to the waste air exhaust stream before entering a drop out zone section housing.

15. The baghouse apparatus according to claim 14 wherein the drop out zone section housing has a converging portion for increasing air stream velocity, a diverging portion for slowing the air stream velocity, and a bottom collecting portion receiving particulates dropped out of the slowing air stream.

16. The baghouse apparatus according to claim 15 wherein the converging portion has one or more stationary plates directed at an angle to the air stream for deflecting and separating particulates from the air stream.

17. The baghouse apparatus according to claim 16 wherein the air stream leaves the drop out zone section through an opening adjacent a bottom collecting portion of the drop out zone section into the cyclonic scrubber section.

* * * * *